United States Patent [19]
Johnson

[11] Patent Number: 5,719,931
[45] Date of Patent: Feb. 17, 1998

[54] ACCESS CODE DIALING APPARATUS AND METHOD

[75] Inventor: John Evan Johnson, New Providence, N.J.

[73] Assignee: Lucent Technologies Inc., Murray Hill, N.J.

[21] Appl. No.: 549,612

[22] Filed: Oct. 27, 1995

[51] Int. Cl.$^6$ .................................................. H04M 1/26
[52] U.S. Cl. .................... 379/356; 379/216; 379/221; 379/355
[58] Field of Search .................... 379/196, 197, 379/199, 200, 189, 216, 112, 355, 354, 221, 356, 377, 201, 113, 114

[56] References Cited

U.S. PATENT DOCUMENTS

| | | | |
|---|---|---|---|
| 3,985,972 | 10/1976 | Rolin et al. | 379/197 |
| 4,188,508 | 2/1980 | Rogers et al. | 379/189 |
| 4,336,422 | 6/1982 | Mellon | 379/189 |
| 4,358,640 | 11/1982 | Murray | 379/200 |
| 4,369,339 | 1/1983 | Castro et al. | 379/197 |
| 4,506,116 | 3/1985 | Genest | 379/196 |
| 4,555,594 | 11/1985 | Friedes et al. | 379/220 |
| 4,565,903 | 1/1986 | Riley | 379/201 |
| 4,751,728 | 6/1988 | Treat | 379/113 |
| 4,756,020 | 7/1988 | Fodale | 379/197 |
| 4,866,763 | 9/1989 | Cooper et al. | 379/221 |
| 4,964,159 | 10/1990 | Son | 379/356 |
| 5,125,022 | 6/1992 | Hunt et al. | 379/199 |
| 5,268,959 | 12/1993 | Hong | 379/356 |
| 5,274,693 | 12/1993 | Waldman | 379/216 |
| 5,341,411 | 8/1994 | Hashimoto | 379/199 |
| 5,440,622 | 8/1995 | Yuki | 379/200 |
| 5,448,617 | 9/1995 | Hong et al. | 379/112 |
| 5,455,858 | 10/1995 | Lin | 379/355 |
| 5,473,681 | 12/1995 | Partridge, III | 379/221 |
| 5,550,910 | 8/1996 | DeJager | 379/220 |
| 5,550,915 | 8/1996 | Partridge, III | 379/355 |

Primary Examiner—Krista Zele
Assistant Examiner—Scott Wolinsky
Attorney, Agent, or Firm—Christopher N. Malvone; Jimmy Goo

[57] ABSTRACT

An automatic access code dialer stores a user entered telephone number and compares the first three digits of the stored telephone number to a list of three digit numbers that specify telephone exchanges that may be contacted using an alternative shorthaul long distance service provider. If the stored digits match one of the numbers on the list, the user entered telephone number and an access code for a alternative service provider are passed to the telephone network. If the stored digits do not match one of the numbers on the list, the user entered telephone number is passed to the telephone network.

7 Claims, 2 Drawing Sheets

| ORIG. ↓ \ DIALED → | $N_1$ | $N_2$ | $N_3$ | ... | $N_{N-1}$ | $N_N$ |
|---|---|---|---|---|---|---|
| $n_1$ | 0 | 1 | 1 | ... | 1 | 1 |
| $n_2$ | 1 | 0 | 0 | ... | 1 | 1 |
| $n_3$ | 1 | 0 | 0 | ... | 1 | 1 |
| ⋮ | ⋮ | ⋮ | ⋮ | ... | ⋮ | ⋮ |
| $n_{N-2}$ | 1 | 0 | 0 | ... | 0 | 1 |
| $n_{N-1}$ | 1 | 1 | 1 | ... | 0 | 1 |
| $n_N$ | 1 | 1 | 1 | ... | 1 | 0 |

ACCESS CODE DIALING APPARATUS AND METHOD

BACKGROUND OF THE INVENTION

1. Field of the Invention

The present invention relates to communications; more specifically, to access code dialing.

2. Description of the Related Art

As the telecommunications industry becomes more competitive, there are more and more providers from which a consumer may choose. These providers sometimes compete in long distance telecommunications, and sometimes, they compete in what is known as shorthaul long distance communications. A consumer may choose between different service providers based on dialing an access code (e.g., 10ATT). The code identifies which service provider should handle a particular call. Using the different codes is inconvenient and confusing to a consumer. A consumer has to go through the inconvenient process of dialing, for example, a five-digit access code before dialing a regular phone number. In the case of shorthaul long distance, the consumer may have to determine whether an alternative service provider is appropriate for a particular exchange (the first three digits after the area code specify the exchange) or whether the default local call service provider is appropriate.

SUMMARY OF THE INVENTION

An embodiment of the present invention addresses these problems by automatically providing an access code when a consumer dials a telephone number. This embodiment stores the numbers as the consumer dials them and determines whether the exchange being called permits use of an alternative service provider for shorthaul long distance, or whether the number specifies a long distance and therefore permits specifying an alternative long distance provider. If an alternative service provider is appropriate, the access code is automatically sent to the telephone network followed by the stored telephone number which was dialed by the consumer. In another embodiment of the present invention, the access codes used to select service providers, may be programmed into a memory using the consumers telephone keypad or through the communications network. In yet another embodiment, the consumer enters his/her telephone number into a memory, and then a pre-programmed table in memory is used to determine if an alternative service provider is appropriate.

DETAILED DESCRIPTION OF THE INVENTION

Figures 1, 3:
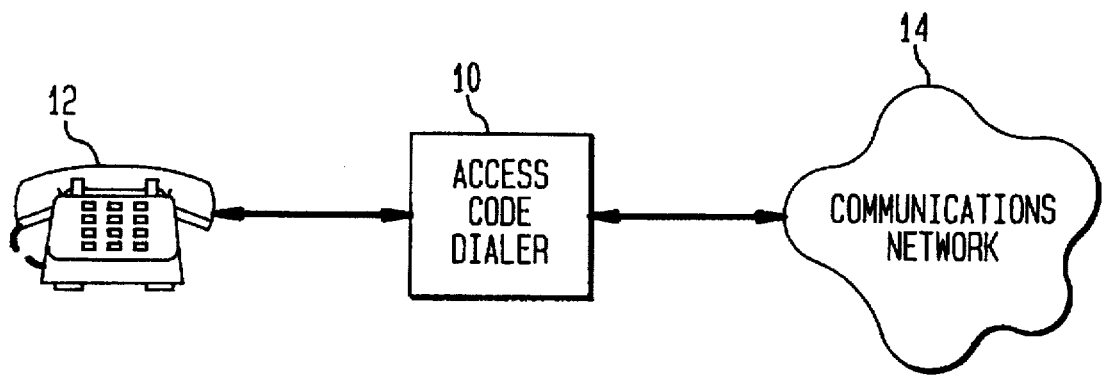
FIG. 1 is a simplified block diagram illustrating the access code dialer's relationship to the telephone network and the user's telephone communication device.
FIG. 3 is a table specifying when an alternative service provider is appropriate.

FIG. 1 illustrates access code dialer 10 positioned between telephone communications device 12 and communications telephone network 14. A user operating telecommunications device 12 dials or enters a telephone number which is received by access code dialer 10. Access code dialer 10 analyzes the number dialed and determines whether an access code should be added. The access code could specify a shorthaul long distance service provider or a long distance service provider. If it is determined that an access code should be added, access code dialer 10 sends the dialed number with the appropriate access code to telecommunications network 14 to complete the call via the desired service provider.

Figure 2:
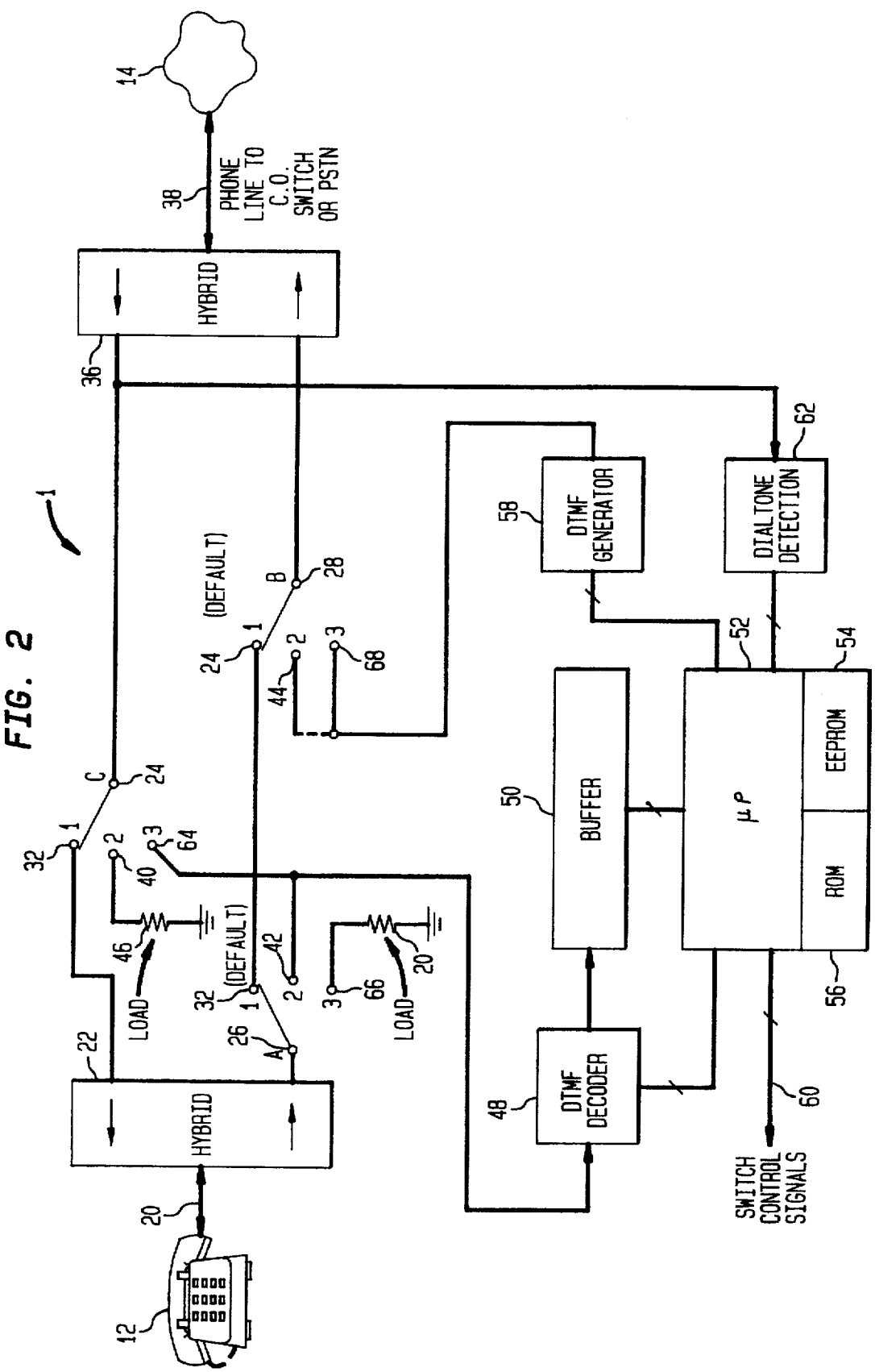
FIG. 2 is a block diagram of the access dialer.

FIG. 2 is a block diagram of access code dialer 10. Telecommunications device 12 sends and receives signals over line 20 to hybrid 22. Hybrid circuit 22 is well known in the art and is used to separate the transmit and receive signals on a conventional telephone line. When placed in a pass-through mode, access code dialer 10 positions switches 24, 26 and 28 so as to make contact with terminals 30, 32 and 34, respectively. As a result, signals to/from hybrid 22 are passed to/from hybrid 36. The signals to/from hybrid 36 are sent out and received via line 38 in order to provide communications with telephone network or PSTN (Public Switched Telephone Network) 14.

When a number is being dialed or entered on telecommunications device 12 by a user, switches 24, 26 and 28 are positioned so as to make contact with terminals 40, 42 and 44 respectively. When switch 24 is positioned to make electrical contact with terminal 40, the signals from hybrid 36 are sent to a simple load such as load resistor 46. Load resister 46 may have a high impedance such as 1MΩ. When switch 26 makes contact with terminal 42 it provides signals from telecommunication device 12 through hybrid 22 to dual tone multi-frequency (DTMF) decoder 48. DTMF decoder 48 decodes the dual tone multi-frequency signals provided by telecommunication device 12 to determine what numbers have been dialed and passes the numbers into buffer 50. DTMF decoders are well known in the art and may be purchased from a variety of vendors. Buffer 50 may be a device such as a shift register having both serial and parallel inputs and outputs. Microprocessor 52 reads the dialed numbers from buffer 50 to determine whether an access code should be added. Processor 52 stores the access codes that identify the service providers desired by the user in EEPROM (Electrically Erasable Programmable Read Only Memory) or non-volatile memory 54. The programs executed by microprocessor or microcomputer 52 are stored in read only memory ROM 56.

Microprocessor 52 examines the dialed number in buffer 50 to determine what, if any, access code should be added to the number. If a 1 plus area code is seen in the number stored in buffer 50, microprocessor 52 accesses EEPROM 54 to determine what code, if any, should be dialed to specify a long distance carrier. If no code is specified, microprocessor 52 sends the number read from buffer 50 to dualtone multi-frequency generator (DTMF) generator 58. Generator 58 generates the standard tones that represent the number received by microprocessor 52 from buffer 50. This signal passes through switch 28 which is making contact with terminal 44 to provide a signal path through hybrid 36 to telephone network 14. DTMF generators are well known in the art and are available from a variety of vendors When microprocessor 52 reads a 1 plus area code number from buffer 50 and finds a access code for long distance dialing in EEPROM 54, microprocessor 52 sends that access code from EEPROM 54 to DTMF generator 58 before sending the remaining portion of the dialed number to generator 58. If a long distance number has not been dialed, microprocessor 52 examines the first 3 digits to determine if the exchange being dialed corresponds to a shorthaul long distance call. (It should be noted that other than three digits may be used to identify shorthaul long distance calls.) Microprocessor 52 executes this examination by comparing the digits specifying the exchange to a list of exchanges that are classified as shorthaul long distance calls. This list is stored in a nonvolatile memory such as EEPROM 54 and may be entered by the user using telecommunication device 12 or may be received from telephone network 14. If microprocessor 52 determines that the exchange dialed is on the list specifying a shorthaul long distance call, microprocessor 52 accesses the code associated with the desired service provider from EEPROM 54 and sends that code to DTMF generator 58 followed by the dialed number. DTMF generator 58 provides the appropriate dualtone multi-frequency signals to telephone network 14 via switch 28 and hybrid 36. If the dialed number from buffer 50 has an exchange that does not specify a shorthaul long distance service provider, or if there is no code entered for a shorthaul service provider, the dialed phone number is simply passed to DTMF generator 58 without first sending a particular access code.

After sending the appropriate set of numbers to the telephone network 14 via DTMF generator 58, microprocessor 58 uses control lines 60 to reposition switches 24, 26 and 28 for the pass through mode, i.e., where switches 24, 26 and 28 make contact with terminals 30, 32 and 34 respectively.

When in operation, access code dialer 10 maintains switches 24, 26 and 28 in the pass through mode. When dial tone detector 62 detects a dial tone from hybrid 36, detector 62 sends a signal to microprocessor 52 which indicates to microprocessor 52 that a user has gone off hook on telecommunications device 12. Dial tone detectors are well known in the art and are available from a variety of vendors. In response to the signal from detector 62, microprocessor 52 positions switches 24, 26, and 38 to make contact with terminals 40, 42 and 44 respectively. At this time access code dialer operates as described above and adds the appropriate access code to the dialed number if necessary. In addition, microprocessor 52 monitors the number dialed into buffer 50 to determine if a local programming mode is desired.

The local programming mode is detected by simply looking for special characters such as three star characters. When in the local programming mode, the user may specify access codes for long distance calls, shorthaul long distance calls, and specify which exchanges (e.g., the first three digits of a seven digit dialed number) indicate that a shorthaul long distance call is being made. After entering the program mode by dialing 3 star characters (***), the user dials the star character and a 1, followed by the access code for the desired long distance carrier and then a pound character (#) to indicate the end of the long distance service provider code. Microprocessor 52 reads the numbers between the *1 and pound sign from buffer 50 and enters that code into EEPROM 54 as the long distance access code. The user may then exit the local programming mode by entering a double pound character (##) or the user may dial *2 and then enter the access code for the shorthaul long distance provider followed by a pound character. Microprocessor 52 then reads the shorthaul long distance provider code by reading the numbers between the *2 and the pound character from buffer 50. This number is then programmed into EEPROM 54 as the shorthaul long distance provider access code. Once again, the user may exit the programming mode at this time by entering two pound characters. If however, the user desires to enter a list of exchanges that should use a shorthaul long distance access code, the user then enters a *3 followed by sets of 3 digits specifying the exchanges that are contacted using a shorthaul long distance service provider.

The sets of 3 digits are separated by a single * character, and when the last set of 3 digits are entered, the user enters two pound characters to exit the local programming mode. Microprocessor 52 reads each set of 3 digits after the *3 where each set of three are separated by a star character and stores those numbers in EEPROM 54 to form a list of exchange numbers associated with shorthaul long distance calls. The process is continued until two pound signs or characters are received which indicate the end of the programming mode. When the programming mode is ended, switches 24, 26 and 28 remain in contact with terminals 40, 42 and 44, respectively, in case the user desires to make a telephone call. When the user goes on hook, switches 24, 26 and 28 are returned to terminals 30, 32 and 34, respectively.

It is also possible for the user to request remote programming of access code dialer 10. This is done by the user going off hook and dialing a star, pound, star (*#*) followed by the number of a programming service available through telephone network 14. The star, pound, star, informs microprocessor 52 that it will receive remote programming after a call is completed to the programming provider. When the user initially going off hook, switches 24, 26 and 28 make contact with terminals 40, 42 and 44 respectively, after the star, pound, star, is read by microprocessor 52 from buffer 50, microprocessor 52 passes the programming service's number to the telephone network via DTMF generator 58 and then places the access code dialer in a remote programming configuration by moving switches 24, 26 and 28 to make contact with terminals 64, 66 and 68, respectively. As a result, dualtone multi-frequency signals received from hybrid 36 are passed through switch 24 to DTMF decoder 48, and signals received by DTMF generator 58 are passed through switch 28 to hybrid 36. Switch 26 simply places a high impedance load on the output of hybrid 22. The high impedance load may be implemented using resister 70 which may be on the order of 1MΩ. When in this configuration, the remote programming service provides the before mentioned manual programming signals (starting with 3 star characters and ending with 2 pound characters) to microprocessor 52 through DTMF decoder 48. Microprocessor 52 then processes the programming signals as described in the manual sequence, except that when the programming is completed, microprocessor 52 repeats all of the programming signals to the programming service through DTMF generator 58 so that the programming service may check for accuracy. If an error is detected by the programming service, the programming service simply repeats the programming sequence as described with the manual programming sequence (starting with 3 star characters and ending with 2 pound characters). If the program repeated to the remote programming service provider via DTMF generator 58 is correct, the remote program provider simply sends 3 pound characters (###) which indicate an end to the programming. Microprocessor 52 then returns switches 24, 26 and 28 to make contact with terminals 30, 32 and 34, respectively. Once in this position, user 12 will hear an end of programming message from the remote programming service to indicate that the user should go on hook to end the communication.

In another embodiment of the present invention, a table which contains a list of exchanges which may use an access code to specify an alternative service provider is preprogrammed stored in EEPROM 54. The table in EEPROM 54 is a universal table of which pairs of exchange numbers can be connected by a shorthaul long distance service provider. This alleviates the need for the consumer to program the exchanges that permit use of a shorthaul long distance service provider. FIG. 3 illustrates a table that may be used for these purposes. Along the top row is the list of exchanges dialed designated $N_1 \ldots N_n$. Along the vertical axis, the originating exchanges are listed and are represented by $n_1 \ldots n_n$. The table contains zeros and ones representing when it is appropriate to use an alternative service provider for the shorthaul long distance call. In order for the table to be used, the consumer simply programs EEPROM 54 with his or her own telephone number using the keypad of his or her telephone communication device. This programming can be carried out simply by entering two star characters (**) followed by the consumer's seven-digit telephone number followed by two pound characters (##). In response to these special characters, microprocessor 52 stores the consumer's telephone number in EEPROM 54.

When the consumer dials a telephone number, microprocessor 52 retrieves the consumer's exchange number from EEPROM 54 and locates the consumer's exchange number on the vertical axis of the table FIG. 3. Once the exchange number is located, that row of the table is used to determine when it is appropriate to enter an access code specifying an alternative shorthaul long distance service provider. Microprocessor 52 then simply compares the dialed exchange with the exchange numbers listed across the horizontal axis of the table and examines the table location where the intersection of the callers exchange number and the dialed exchange number occur. If there is a "one" in that location, an alternative service provider is appropriate, and; if there is a zero in that location, an alterative service provider is not appropriate. As before, if an alternative service provider is appropriate, the access code is sent to network 14 ahead of the dialed number, and if an access code is not appropriate, the dialed number is sent to network 14 without an access code.

The invention claimed is:

1. An automatic access code dialing method comprising the steps of:

providing an access code dialer, said access code dialer establishing a connection between a telephone communication device and a communication network;

automatically breaking the connection between the telephone communication device and the communication network using the access code dialer;

storing a user entered telephone number received from the telephone communication device in the access code dialer as a stored number;

comparing at least a portion of the stored number to a list of numbers;

providing the stored number to the communication network without an access code if the list does not contain the portion of the stored number compared to the list of numbers;

providing the stored number to the communication network with an access code if the list does contain the portion of the stored number compared to the list of numbers; and automatically re-establishing the connection between the telephone communication device and the communication network using the access code dialer.

2. The method of claim 1, further comprising the steps of determining if the stored number is a long distance number and providing the stored number to the communication network with a long distance access code if the stored number specifies a long distance communication.

3. The method of claim 1, further comprising the step of forming the list of numbers by entering a number using a telecommunication device keypad and storing the number in a nonvolatile memory.

4. The method of claim 1, further comprising the step of forming the list of numbers by receiving a number from a telecommunications network and storing the number in a nonvolatile memory.

5. The method of claim 1, further comprising the step of storing an access code entered using a telecommunication device keypad.

6. The method of claim 1, further comprising the step of storing an access code received from a telecommunications network.

7. An access code dialer, comprising:

a first interface for connection to a telephone communication device;

a second interface for connection to a communication network;

a buffer for storing a user entered telephone number received from the first interface as a stored number;

a plurality of switches having (i) a first configuration for automatically establishing a connection between the first interface and the second interface and (ii) a second configuration for automatically breaking the connection between the first interface and the second interface and automatically establishing a connection between the first interface and the buffer immediately before the telephone number is received by the first interface;

a nonvolatile memory for storing a list of numbers;

a DTMF generator that provides DTMF signals to the second interface; and a processor for comparing at least a portion of the stored number to the list of numbers, the processor providing the stored number and an access code to the DTMF generator if at least a portion of the stored number matches a number on the list and the processor providing the stored number without an access code to the DTMF generator if at least a portion of the stored number does not match a number on the list.

* * * * *